United States Patent
Kameno et al.

(10) Patent No.: US 12,217,066 B2
(45) Date of Patent: Feb. 4, 2025

(54) IMAGE CREATION SUPPORT DEVICE AND METHOD FOR PRESENTING CANDIDATE SCREEN DATA OF A DISPLAY SCREEN BASED ON A DESIGN IMAGE OF THE DISPLAY SCREEN

(71) Applicant: FANUC CORPORATION, Yamanashi (JP)

(72) Inventors: Akihiro Kameno, Yamanashi (JP); Kouji Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 177 days.

(21) Appl. No.: 17/758,964

(22) PCT Filed: Jan. 14, 2021

(86) PCT No.: PCT/JP2021/001055
§ 371 (c)(1),
(2) Date: Jul. 15, 2022

(87) PCT Pub. No.: WO2021/145379
PCT Pub. Date: Jul. 22, 2021

(65) Prior Publication Data
US 2023/0083887 A1    Mar. 16, 2023

(30) Foreign Application Priority Data
Jan. 17, 2020   (JP) .................. 2020-006106

(51) Int. Cl.
*G06F 9/451*   (2018.01)
*G06F 16/51*   (2019.01)

(52) U.S. Cl.
CPC .............. *G06F 9/451* (2018.02); *G06F 16/51* (2019.01)

(58) Field of Classification Search
CPC ................................ G06F 9/451; G06F 16/51
See application file for complete search history.

(56) References Cited

U.S. PATENT DOCUMENTS

| | | | |
|---|---|---|---|
| 7,617,449 B2* | 11/2009 | Carlson | G06F 40/186 715/255 |
| 7,712,036 B2* | 5/2010 | Anderson | G06F 40/10 715/762 |

(Continued)

FOREIGN PATENT DOCUMENTS

| | | |
|---|---|---|
| JP | H6332645 A | 12/1994 |
| JP | H8166865 A | 6/1996 |

(Continued)

OTHER PUBLICATIONS

Lamberti et al., "Extensible GUIs for Remote Application Control on Mobile Devices," IEEE Computer Graphics and Applications, Jul./Aug. 2008, pp. 51-57 (Year: 2008).*

(Continued)

*Primary Examiner* — Eric J. Bycer
(74) *Attorney, Agent, or Firm* — HAUPTMAN HAM, LLP

(57) ABSTRACT

An image creation support device includes an image input unit that reads a design image P to create input screen data ID, a database that stores pieces of parts data designed in the past, and a screen data creation unit that creates the candidate screen data CD corresponding to the display screen from the pieces of parts data. The database also stores the types of the pieces of parts data and group definition information GI that is based on a combination of the pieces of parts data. The screen data creation unit includes a type identification unit that identifies the type PT of each input part, and an additional information creation unit that creates (Continued)

additional information AI to be combined with the type PT based on the group definition information GI.

13 Claims, 13 Drawing Sheets

(56) References Cited

U.S. PATENT DOCUMENTS

| | | | | |
|---|---|---|---|---|
| 9,461,972 | B1* | 10/2016 | Mehta | H04L 63/0435 |
| 2004/0123244 | A1* | 6/2004 | Campbell | G06F 40/103 |
| | | | | 715/253 |
| 2005/0085937 | A1* | 4/2005 | Goodwin | G06F 8/60 |
| | | | | 700/107 |
| 2006/0085470 | A1* | 4/2006 | Schmitt | G06F 16/20 |
| | | | | 707/999.102 |
| 2007/0150852 | A1* | 6/2007 | Balderas | G06F 8/36 |
| | | | | 717/106 |
| 2010/0262902 | A1* | 10/2010 | Burns | G06F 16/211 |
| | | | | 715/764 |
| 2013/0111376 | A1* | 5/2013 | Shinomoto | G06F 3/048 |
| | | | | 715/763 |
| 2013/0275892 | A1* | 10/2013 | Li | G06F 3/0484 |
| | | | | 715/762 |
| 2014/0282125 | A1* | 9/2014 | Duneau | G06F 9/451 |
| | | | | 715/762 |
| 2016/0098172 | A1* | 4/2016 | Bacinschi | G06F 8/38 |
| | | | | 715/747 |
| 2017/0192797 | A1* | 7/2017 | Snir | G06F 40/106 |
| 2018/0096358 | A1* | 4/2018 | Sundaram | G06F 40/186 |
| 2018/0275845 | A1* | 9/2018 | Barbee | G06F 3/0482 |
| 2018/0300296 | A1* | 10/2018 | Ziraknejad | G06F 16/93 |
| 2018/0349730 | A1* | 12/2018 | Dixon | G06F 3/0486 |
| 2020/0104353 | A1* | 4/2020 | Chua | G06F 16/337 |
| 2020/0117431 | A1* | 4/2020 | Geva | G06F 8/38 |
| 2020/0133642 | A1* | 4/2020 | Payne | G06F 8/38 |
| 2022/0215606 | A1* | 7/2022 | Radford | G06F 40/103 |

FOREIGN PATENT DOCUMENTS

| | | |
|---|---|---|
| JP | 2004272865 A | 9/2004 |
| JP | 2008226102 A | 9/2008 |
| JP | 2012155367 A | 8/2012 |
| WO | 2018073871 A1 | 4/2018 |

OTHER PUBLICATIONS

Ramon et al., "Re-Engineering Graphical User Interfaces from their Resource Files with UsiResourcer," IEEE 7th International Conference on Research Challenges in Information Science, May 29-31, 2013, 12 pgs. (Year: 2013).*

Chen et al., "From UI Design Image to GUI Skeleton: A Neural Machine Translator to Bootstrap Mobile GUI Implementation," 2018 ACM/IEEE 40th International Conference on Software Engineering, pp. 665-676. (Year: 2018).*

International Search Report in PCT/JP2021/001055, mailed Apr. 13, 2021. 2pp.

* cited by examiner

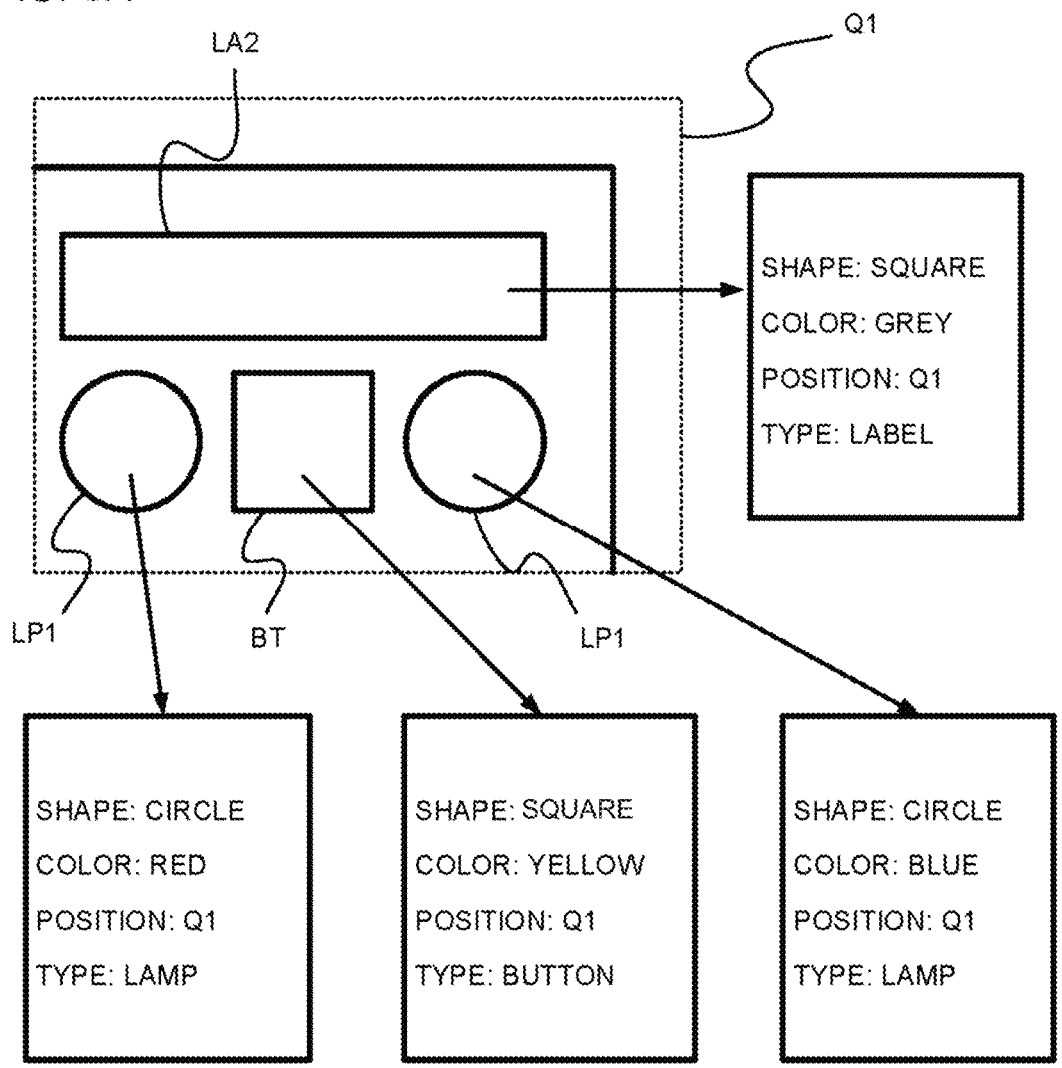

FIG. 5C

| <PART 1> | <PART 2> | <PART 3> | <PART 4> |
|---|---|---|---|
| SHAPE: SQUARE<br>COLOR: GREY<br>POSITION: Q1<br>TYPE: LABEL | SHAPE: CIRCLE<br>COLOR: RED<br>POSITION: Q1<br>TYPE: LAMP | SHAPE: SQUARE<br>COLOR: YELLOW<br>POSITION: Q1<br>TYPE: BUTTON | SHAPE: CIRCLE<br>COLOR: BLUE<br>POSITION: Q1<br>TYPE: LAMP |

⬇

| <PART 1> | <PART 2> | <PART 3> | <PART 4> |
|---|---|---|---|
| SHAPE: SQUARE<br>COLOR: GREY<br>POSITION: Q1<br>TYPE: LABEL | SHAPE: CIRCLE<br>COLOR: RED<br>POSITION: Q1<br>TYPE: LAMP | SHAPE: CIRCLE<br>COLOR: YELLOW<br>POSITION: Q1<br>TYPE: LAMP | SHAPE: CIRCLE<br>COLOR: BLUE<br>POSITION: Q1<br>TYPE: LAMP |

FIG. 6A

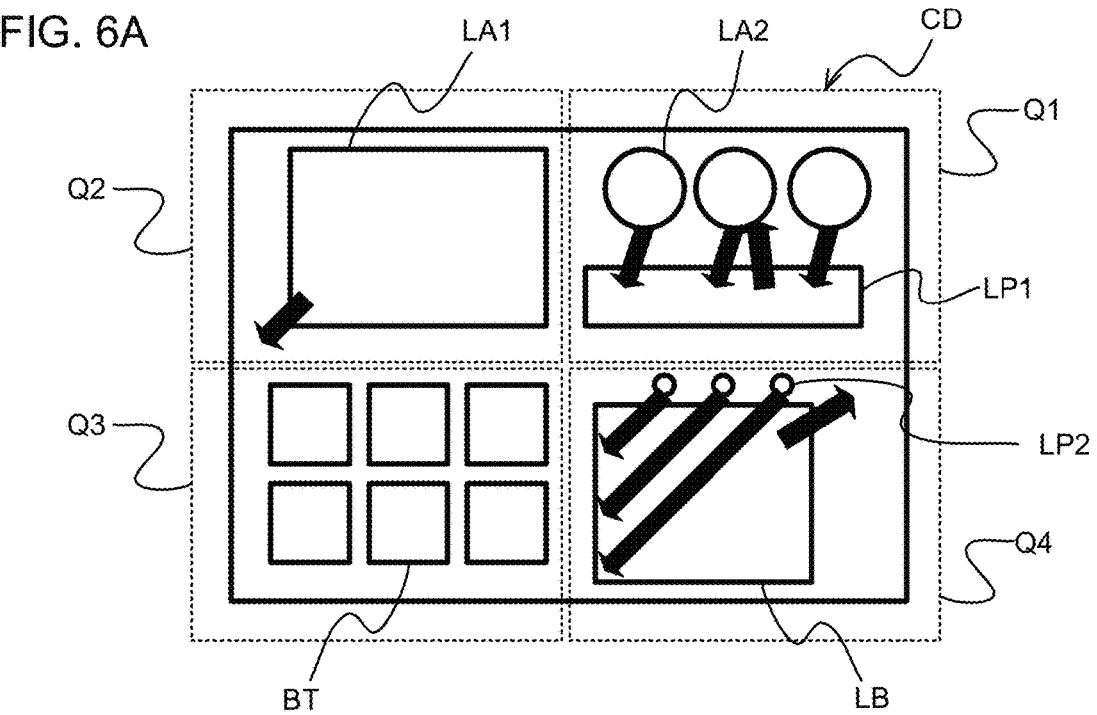

| | SHAPE | COLOR | POSITION |
|---|---|---|---|
| | CIRCLE | RED | Q1 |
| NUMBER-OF-TIMES INFORMATION $c_i$ | LAMP : 30/42<br>BUTTON : 10/42<br>LABEL : 2/42 | LAMP : 26/32<br>BUTTON : 4/32<br>LIST : 2/42 | LAMP : 6/13<br>BUTTON : 4/13<br>LABEL : 3/13 |
| WEIGHTING FACTOR | 0.6 | 0.3 | 0.1 |

IMAGE CREATION SUPPORT DEVICE AND METHOD FOR PRESENTING CANDIDATE SCREEN DATA OF A DISPLAY SCREEN BASED ON A DESIGN IMAGE OF THE DISPLAY SCREEN

RELATED APPLICATIONS

The present application is a National Phase of International Application No. PCT/JP2021/001055 filed Jan. 14, 2021, which claims priority to Japanese Application No. 2020-006106, filed Jan. 17, 2020.

TECHNICAL FIELD

The present invention relates to an image creation support device and image creation support method for presenting candidate screen data of a display screen based on a design image of the display screen that has been designed arbitrarily.

BACKGROUND ART

Parts, such as buttons, labels, and list boxes, for selecting a step to be controlled or a function are laid out on a display screen of a display device (for example, a touch panel display device), which displays numerical values, control parameters, and the like indicating the state of a control object, for a controller that controls the operation of an industrial machine represented by a machine tool, for example. A user of the controller is able to select an operation or a function of the control object by touching such parts.

A display device applied to such a controller usually functions as a user interface that can receive or display a selection operation, such as on/off, input by a user. Thus, ingenuity should be exercised in laying out the aforementioned parts on the display screen so that the user is able to easily input an operation. To determine or create the layout of such parts on the display screen, an image creation support technique is adopted.

As example of the image creation support technique for such a display device, Patent Literature 1 discloses a screen data editing device for a programmable display, including a data storage means for storing a plurality of parts each belonging to any one of a plurality of types, and storing one or more part group screens including the parts, the device being adapted to generate a part group screen for a programmable display by allowing a user to edit a part group screen on a editing screen, store the generated part group screen into the data storage means, and create project data including one or more of the stored part group screens, the device including an application information generation means for, for each of the part group screens stored in the data storage means, calculating the actual used area of a part of each type based on the size and the number of times of editing of each part included in the part group screen, selecting a type with the largest actual used area as a specific type, determining the application of the part group screen according to the specific type, and generating application information indicating the application of the part group screen; an attribute information storage means for storing, for each of the part group screens stored in the data storage means, the actual used area of the specific type and the application information generated by the application information generation means; a means for extracting from among the part group screens stored in the data storage means part group screens whose application is the same as an application designated in newly creating a part group screen based on the application information stored in the attribute information storage means, and setting the rank order for each of the extracted part group screens based on the actual used area of the specific type stored in the attribute information storage means; and a means for displaying a list of the extracted part group screens based on the set rank order. According to such a device, the existing project data can be easily reused, and desired data can be easily searched for. Thus, there is no need to newly create similar screens many times, or spend a long time in searching for intended data to reuse project data.

In addition, Patent Literature 2 discloses a display screen creation support device including a display data storage unit that holds display data, which is used for a display screen of a programmable display and is data of screen parts indicating the states of the parts, a display screen creation unit that creates a display screen using the screen parts, and a display unit that displays a screen for receiving a search condition for searching for display data, in which the display screen creation unit includes a search execution unit that receives a search condition and searches for display data in the display data storage unit based on the search condition. According to such a device, screen parts each corresponding to display data provided with a search tag that matches a search keyword are combined into a group classified according to display attributes, and are displayed in a list for each group, so that a user is able to efficiently create a display screen with uniform design.

CITATION LIST

Patent Literature

[Patent Literature 1] Japanese Patent Laid-Open No. 2012-155367
[Patent Literature 2] International Publication No. WO 2018/073871

SUMMARY OF INVENTION

Technical Problem

By the way, to create the display screen of the aforementioned display device, a design image of the display screen is usually used. In such a case, it is often the case that a creator of the design image who designs the display screen is different from an operator who creates the display screen of the display device for the controller.

When a display screen is created with reference to a design image in this manner, it would be only possible to perform an operation of extracting from a compiled database parts data serving as a reference regarding the type, shape, and the like of each part represented in the design image for creating the display screen, even if the support technique disclosed in Patent Literature 1 or Patent Literature 2 is used, for example. Therefore, the operator who creates the display screen should select suitable parts data from among pieces of parts data presented by the support device and also correct the position, the detailed shape, and the like of each part according to the reference design image.

From such background, there has been a demand for an image creation support technique that can faithfully reproduce a design that is referred to in creating a display screen and thus can reduce the portions to be corrected.

Solution to Problem

An image creation support device according to an aspect of the present invention for presenting candidate screen data of a display screen based on a design image of the display screen that has been designed arbitrarily includes an image input unit that reads the design image to create input screen data; a database that stores pieces of parts data of display parts forming the display screen designed in the past; and a screen data creation unit that obtains the pieces of parts data from the database to create the candidate screen data corresponding to the display screen, in which the database also stores types of the pieces of parts data and group definition information that is based on a combination of the pieces of parts data, the screen data creation unit includes a type identification unit that identifies types of input parts included in the input screen data, and an additional information creation unit that creates additional information to be combined with the types of the input parts based on the group definition information, and the screen data creation unit creates the candidate screen data corresponding to the input screen data based on the types of the input parts and the additional information.

An image creation support method according to an aspect of the present invention for automatically creating candidate screen data of a display screen based on a design image of the display screen that has been designed arbitrarily is a method in which when, after the design image has been read and input screen data has been created, pieces of parts data are obtained from a database that stores pieces of parts data of display parts forming the display screen designed in the past so that candidate screen data corresponding to the display screen is created, types of the pieces of parts data and group definition information that is based on a combination of the pieces of parts data are also stored in the database, and the candidate screen data is, after types of input parts included in the input screen data have been identified and additional information to be combined with the types of the input parts has been created based on the group definition information, created based on the types of the input parts and the additional information.

Advantageous Effects of Invention

According to an aspect of the present invention, as the image input unit reads a design image to create input screen data, and the screen data creation unit creates candidate screen data corresponding to the input screen data based on the types of input parts and additional information, it is possible to faithfully reproduce a design that is referred to in creating a display screen and thus reduce the portions to be corrected.

BRIEF DESCRIPTION OF DRAWINGS

FIG. 5A is a schematic view illustrating an example of an operation of correcting the type based on additional information created by an additional information creation unit.

FIG. 5B is a schematic view illustrating an example of an operation of correcting the type based on additional information created by the additional information creation unit.

FIG. 5C is a schematic view illustrating an example of an operation of correcting the type based on additional information created by the additional information creation unit.

FIG. 6A is a schematic view illustrating an example of candidate screen data created by a screen data creation unit.

DESCRIPTION OF EMBODIMENTS

Hereinafter described with reference to the drawings are specific embodiments of an image creation support device and image creation support method for presenting candidate screen data of a display screen based on a design image of the display screen that has been designed arbitrarily according to a representative example of the present invention.

Embodiment 1

Figure 1:
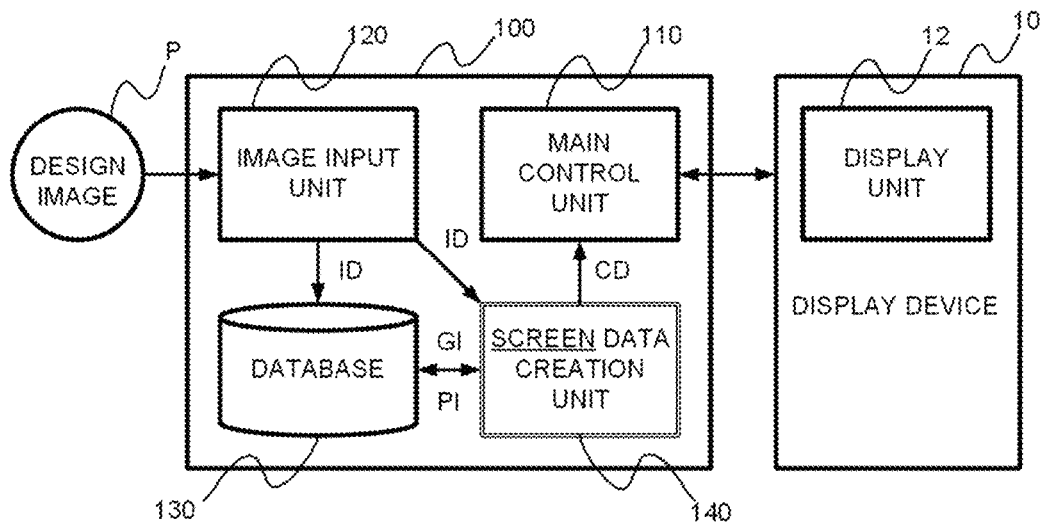
FIG. 1 is a block diagram illustrating an overview of an image creation support device according to Embodiment 1.

Described first with reference to FIGS. 1 to 6B is an overview of an image creation support device and image creation support method for presenting candidate screen data of a display screen based on a design image of the display screen that has been designed arbitrarily according to Embodiment 1 that is a representative example of the present invention. FIG. 1 is a block diagram illustrating an overview of the image creation support device according to Embodiment 1 of the present invention. As illustrated in FIG. 1, an image creation support device 100 is adapted to be applied in combination with a display device 10 provided on a control object, such as an industrial machine, for example, and includes a main control unit 110 that exchanges data with the display device 10 and also controls the entire operation of the image creation support device 100, an image input unit 120 that reads a design image P created as a paper-based medium or electronic data to create input screen data ID, a database 130 that stores parts data of display parts forming a display screen designed in the past, and a screen data creation unit 140 that obtains the parts data from the database 130 to create candidate screen data CD corresponding to the display screen.

The display device 10 includes a display unit 12 that partially forms the control object and displays numerical values, control parameters, and the like indicating the state of the control object. The display device 10 is preferably configured as a user interface including an input mechanism (not illustrated) with which a user is able to select a function or input a numerical value to be controlled. Examples of such a display device include a touch panel display device.

The main control unit 110 of the image creation support device 100 has a function of receiving the candidate screen data CD from the screen data creation unit 140 described below, and sending the candidate screen data CD to the display device 10. At this time, the main control unit 110 is electrically connected to the display device 10 by wire or wirelessly so that the main control unit 110 and the display device 10 can mutually exchange signals. In addition, the main control unit 110 also controls the operation of the entire image creation support device 100 including the image input unit 120 and the screen data creation unit 140.

Figure 3:
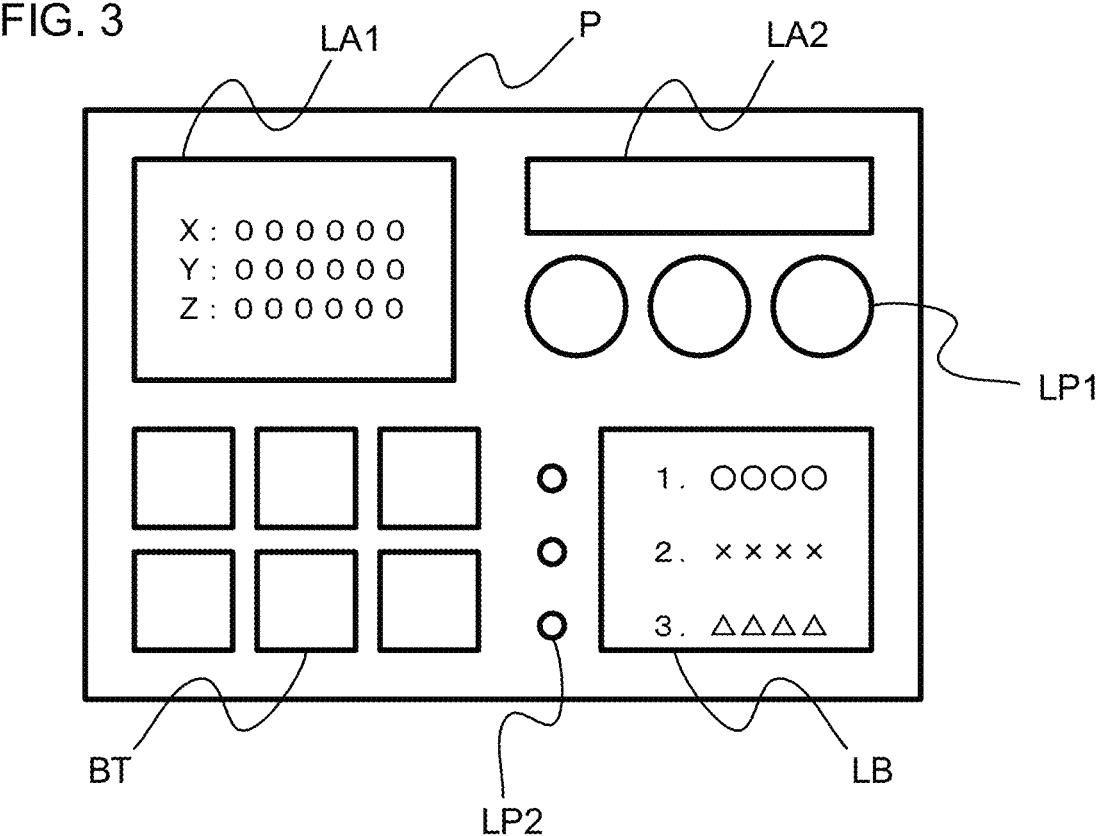
FIG. 3 is a schematic view illustrating an example of a design image applied to an image creation support method according to Embodiment 1.

The image input unit 120 has a function of reading a design image P of a display screen created by a designer in advance, for example, to create electronic input screen data ID. The design image P has been recorded on a medium, such as paper, as a full-color handwritten picture or printed characters as illustrated in FIG. 3, for example. In the example illustrated in FIG. 3, the design image P includes one or more labels LA1 and LA2 that display parameters or numerical values, one or more lamps LP1 and LP2 that turn on or off in a single color or multiple colors, one or more buttons BT with which selection or no selection can be input by touching (i.e., pressing) the screen, and one or more list boxes LB describing predetermined sentences, for example.

The image input unit 120 reads the entire region of the design image P as data, and captures the aforementioned labels LA1 and LA2, lamps LP1 and LP2, buttons BT, or list boxes LB, for example, as "parts data" of the design image P. Examples of such an image input unit 120 include an optical scanner and a device with a function of converting a captured image into pixel data.

Figure 4A:
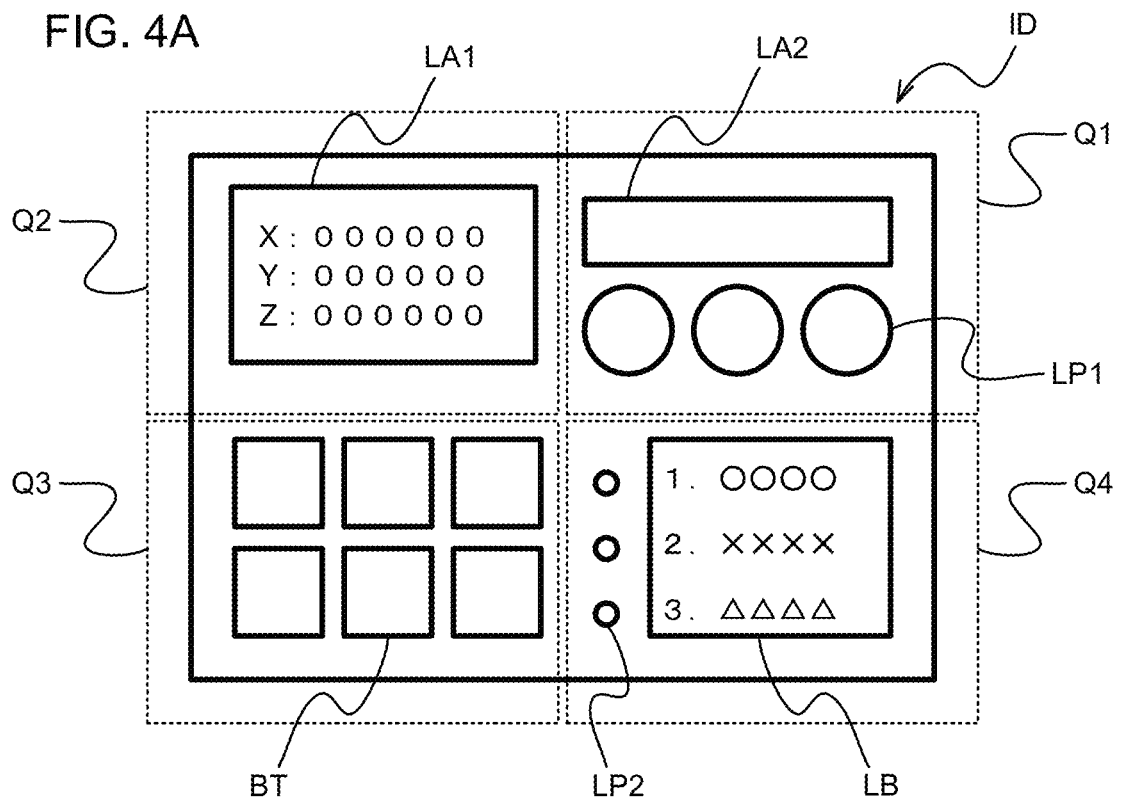
FIG. 4A is a schematic view illustrating an example of input screen data created by an image input unit and the results of identification performed by a type identification unit.
Figure 4B:
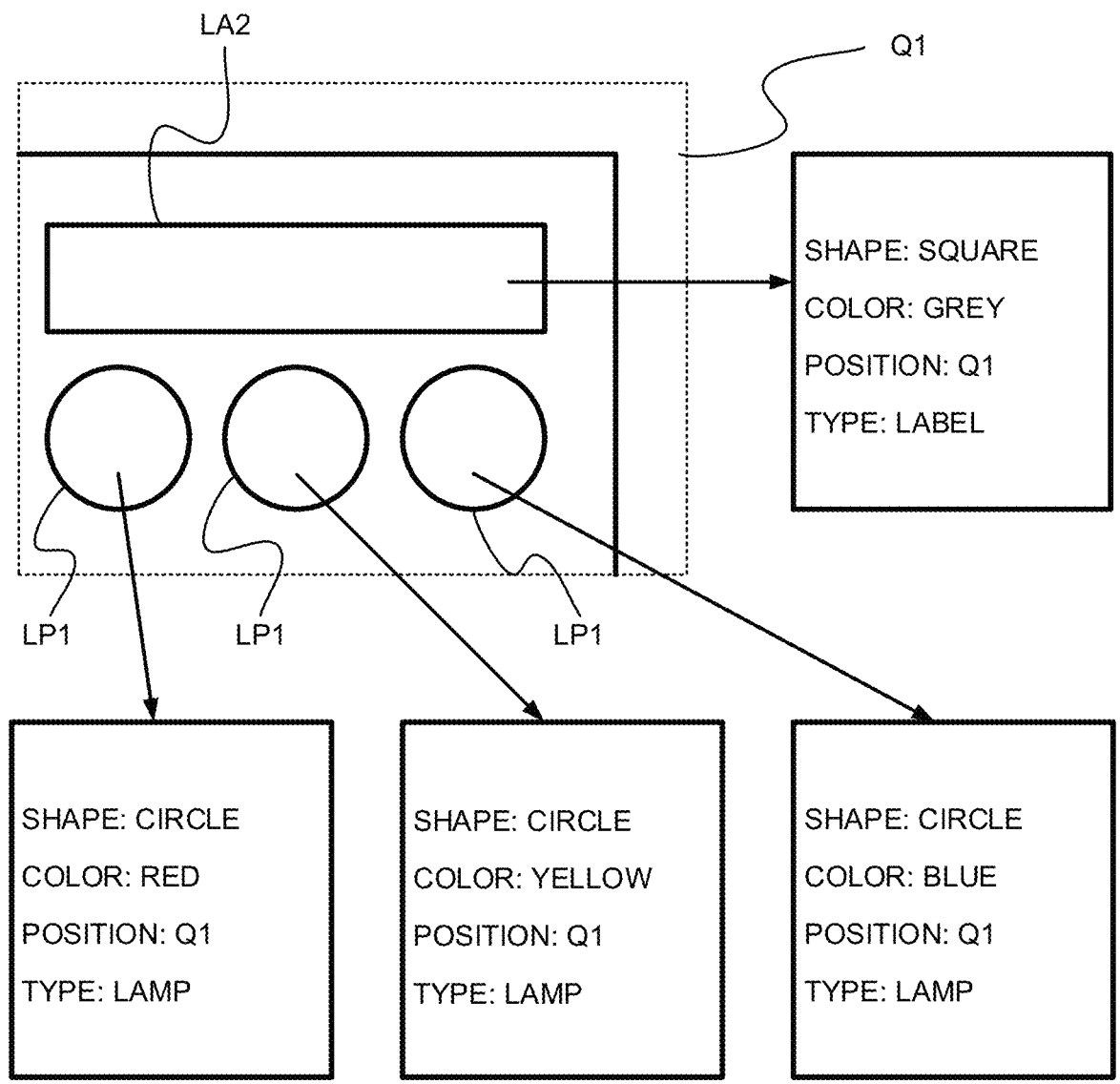
FIG. 4B is a schematic view illustrating an example of input screen data created by the image input unit and the results of identification performed by the type identification unit.

As illustrated in FIG. 4A, the input screen data ID is obtained by, for example, dividing the entire region of the design image P into a first quadrant Q1 to a fourth quadrant Q4, and creating data therefrom while providing a quadrant name as positional information to parts included in each quadrant. Accordingly, as illustrated in FIG. 4B, the shape, color, position, and the like are provided as the basic information to each part. It should be noted that in FIGS. 4A to 4C, a type, such as "label," "button," "lamp," or "list box," is provided to each part, but in the stage where the image input unit 120 has just read the design image and created electronic data, the type of each part is not identified yet.

The database 130 stores "parts data" of a display screen used or read in the past. At this time, the stored "parts data" is stored as "parts information" PI with the type added thereto in addition to the aforementioned shape, color, and position. The parts information PI of the "parts data" also includes, for a specific part, "number-of-times information" CI, which indicates how many times the shape, color, position, or type of the part has been used for each factor, and a combination of the shapes, colors, positions, and types when a plurality of specific parts together form a group, as "group definition information" GI.

Figure 2:
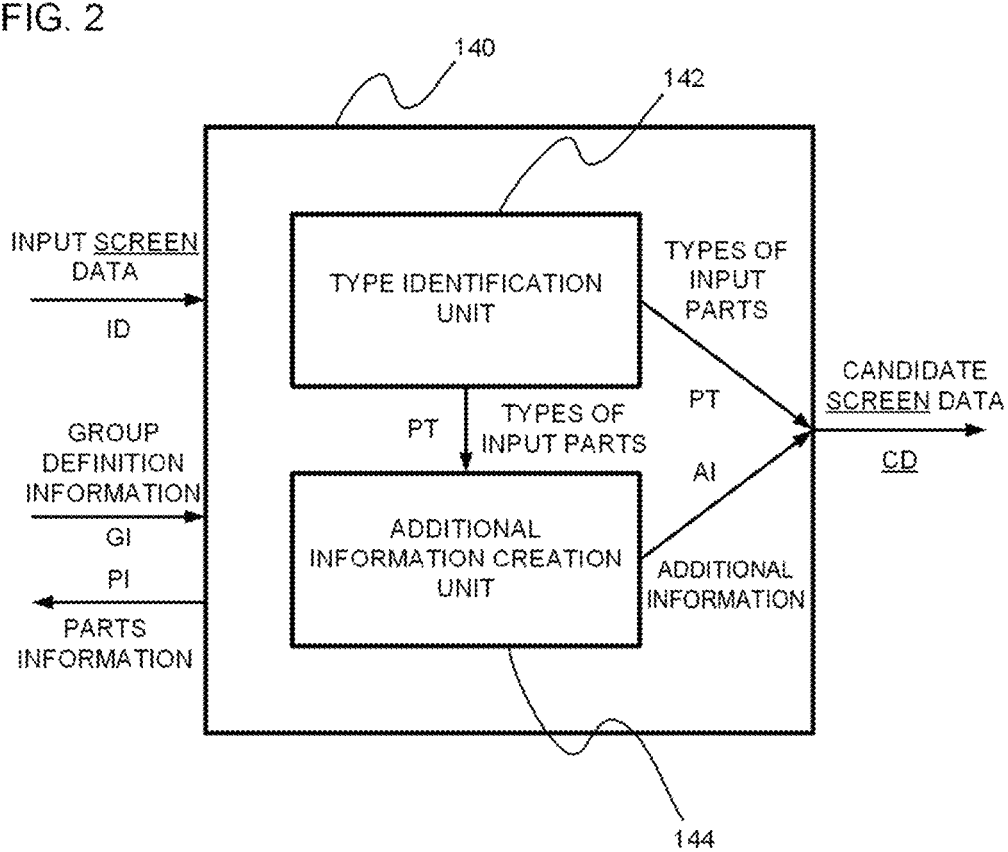
FIG. 2 is a block diagram illustrating an exemplary specific configuration of a screen data creation unit according to Embodiment 1.

FIG. 2 is a block diagram illustrating an exemplary specific configuration of the screen data creation unit according to Embodiment 1. As illustrated in FIG. 2, the screen data creation unit 140 includes a type identification unit 142 that identifies the type PT of each input part included in the input screen data ID, and an additional information creation unit 144 that creates additional information AI for the type PT of the input part based on the group definition information GI. The screen data creation unit 140 is configured to create the candidate screen data CD corresponding to the input screen data ID based on the type PT of each part identified by the type identification unit 142 and the additional information AI created by the additional information creation unit 144, and send the data to the main control unit 110.

Next, the procedures of an image creation support method that uses the image creation support device 100 according to Embodiment 1 will be described.

First, for example, the image input unit 120 reads the design image P such as the one illustrated in FIG. 3, and creates the input screen data ID such as the one illustrated in FIG. 4A. Then, the created input screen data ID is stored in the database 130 and is also sent to the screen data creation unit 140.

As illustrated in FIG. 2, the screen data creation unit 140 receives the input screen data ID from the image input unit 120, and also obtains the group definition information GI, for example, by accessing the database 130. Meanwhile, the screen data creation unit 140 sends to the database 130 the parts information PI including the type PT of each part identified by the type identification unit 142 and the additional information AI created by the additional information creation unit 144. Accordingly, information stored in the database 130 is updated.

As illustrated in FIG. 4B, the type identification unit 142 individually extracts each part included in the first quadrant Q1 of the input screen data ID, for example. At this time, as an exemplary method for identifying the type PT of each part with the type identification unit 142, it is possible to apply a method of providing a definition that allows the shape and the type of each part to be associated with each other, and preferentially using the shape of a part that should be identified as an index for identification. Accordingly, from the first quadrant Q1 illustrated in FIG. 4B, the parts information PI is extracted for one label LA2 and three lamps LP1, for example, as the basic information of the parts data including the type PT of each part.

Figure 4C:
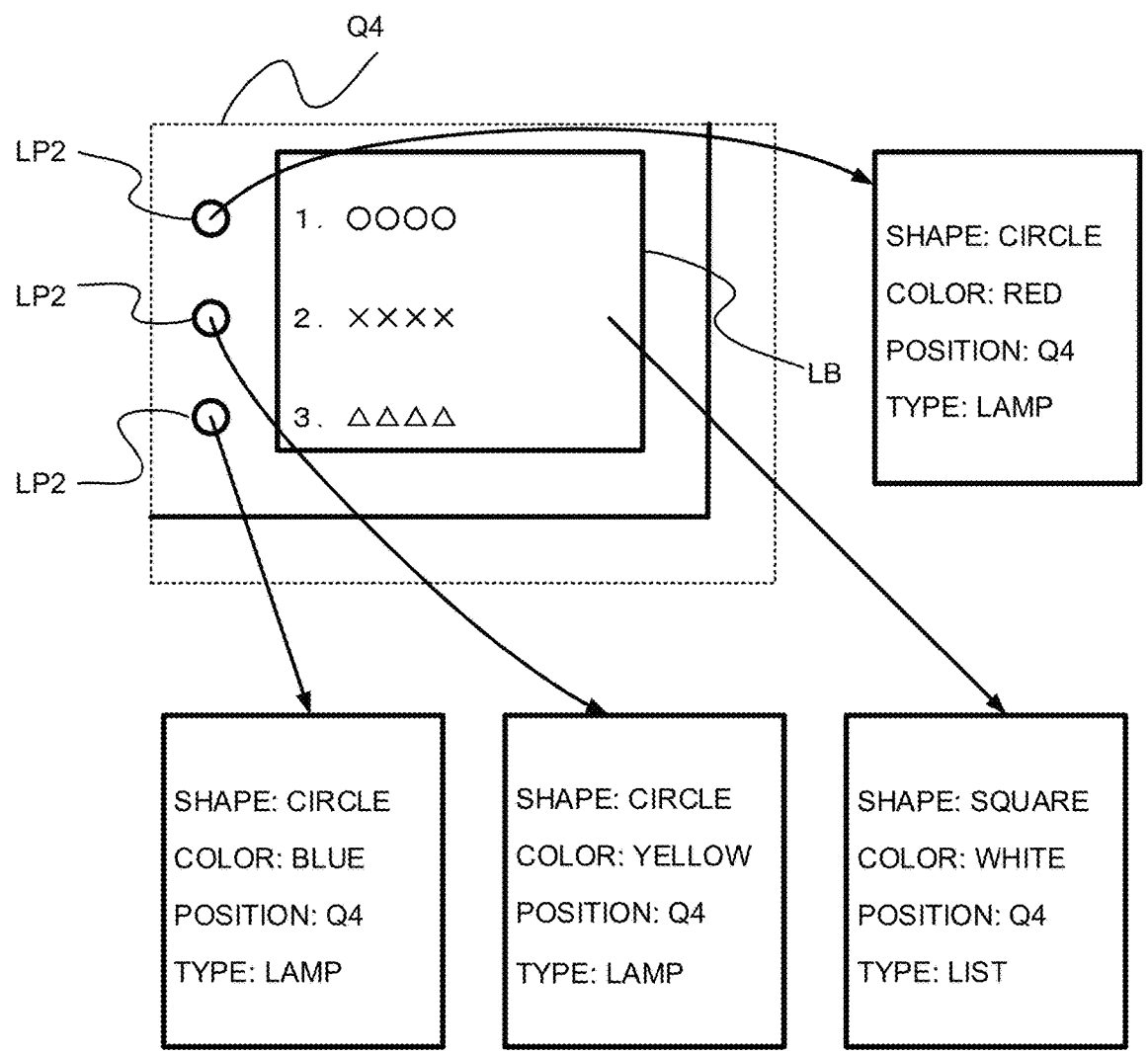
FIG. 4C is a schematic view illustrating an example of input screen data created by the image input unit and the results of identification performed by the type identification unit.

Likewise, from the fourth quadrant Q4 illustrated in FIG. 4C, for example, the parts information PI of the parts data including the type PT of each part is extracted for three lamps LP2 and one list box LB, for example. The thus extracted parts information PI is sent to the database 130 as new reference data to be used for identification, and thus is additionally stored therein.

Meanwhile, in the image creation support device 100 according to Embodiment 1, an operation of creating the additional information AI for correcting the type PT of each part identified by the type identification unit 142 as appropriate is executed. That is, first, the type PT of the parts data identified by the type identification unit 142 is sent to the additional information creation unit 144.

Next, the screen data creation unit 140 accesses the database 130 to receive the group definition information GI that is based on the parts data stored in the past. At this time, the screen data creation unit 140 refers to the parts information PI of the currently identified part, and selects a group to which the shape, color, or position of the part as the identification target belongs.

For example, as illustrated in FIG. 5A, it is assumed that when parts data identified as one label LA2, one button BT, and two lamps LP1 is extracted from the first quadrant Q1 of the input screen data ID, the group definition information GI corresponding to the position Q1 such as the one illustrated in FIG. 5B is also received. In such a case, although the extracted parts data includes the button BT and the lamps LP1, the group definition information GI based on the display screen created in the past includes only three lamps LP1, for example. Thus, the additional information creation unit 144 creates additional information AI for correcting the type PT of the part, which has been identified as the button BT by the type identification unit 142, to the lamp LP1. Then, such pieces of information are combined so that as illustrated in FIG. 5C, for the current input screen data ID, the type PT of a part 3 identified as the button BT is recognized as the lamp LP1.

Next, as illustrated in FIG. 6A, the screen data creation unit 140 combines the input screen data ID, the types PT of the parts identified by the type identification unit 142, and the additional information AI created by the additional information creation unit 144, and arranges the extracted parts on the first quadrant Q1 to the fourth quadrant Q4 to create the candidate screen data CD, and then sends the data to the main control unit 110. Then, the created candidate screen data CD is transferred from the main control unit 110 to the display device 10 and is displayed on the display unit 12.

Figure 6B:
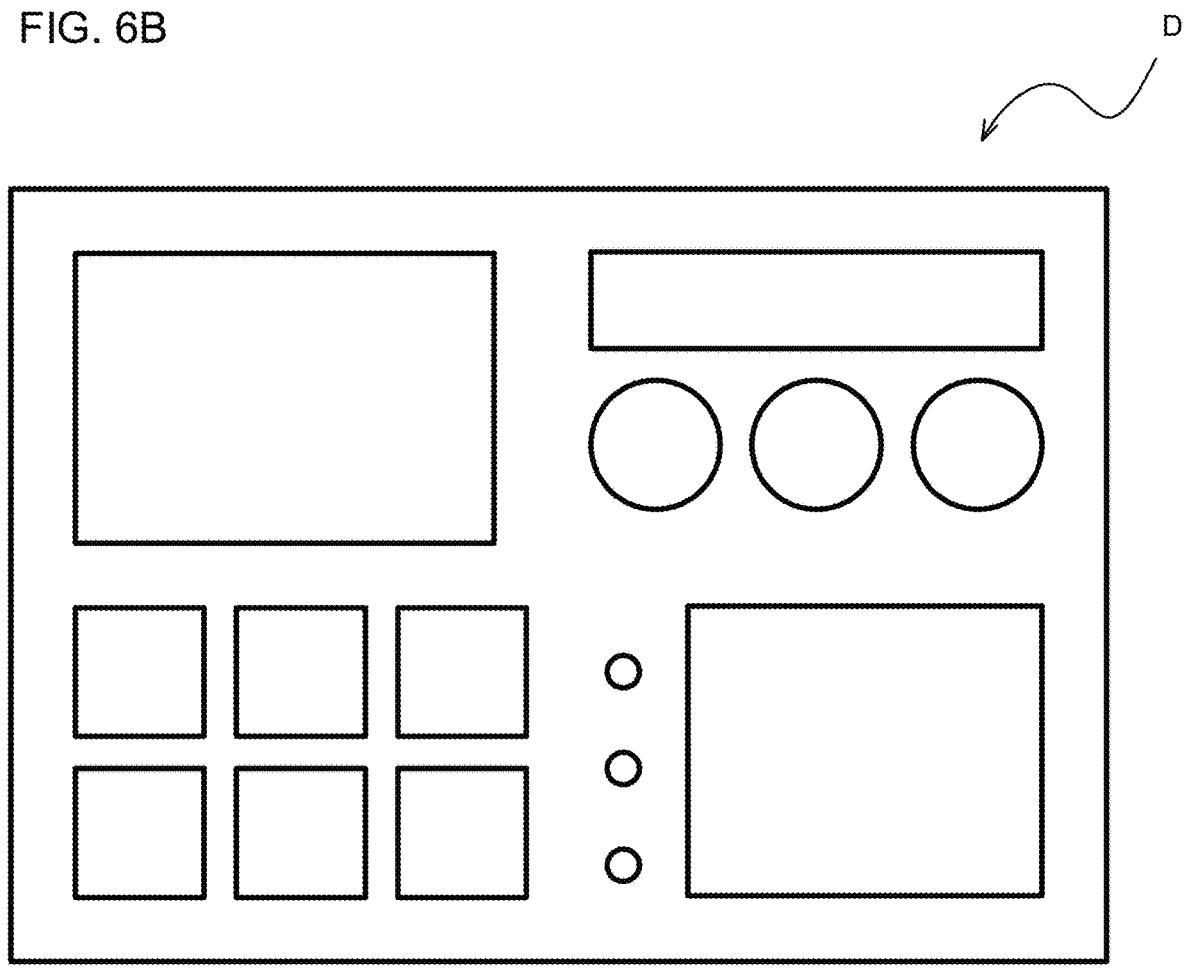
FIG. 6B is a schematic view illustrating an example of candidate screen data created by the screen data creation unit.

At this time, if there is no need to correct the detailed positions of the arranged parts, the candidate screen data CD is determined as a display screen D as is as illustrated in FIG. 6B. Meanwhile, as illustrated in FIG. 6A, if the user determines that the positions of the parts of the candidate screen data CD created by the screen data creation unit 140 should be corrected or if the user wishes to do so, for example, it is possible to add a function of obtaining the final display screen D by allowing the user to perform selection, such as input, for directly moving the parts of the candidate screen data CD displayed on the display unit 12.

Figure 7A:
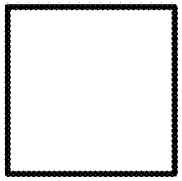
FIG. 7A is a schematic view illustrating a modified example of additional information created by the additional information creation unit.
Figure 7B:
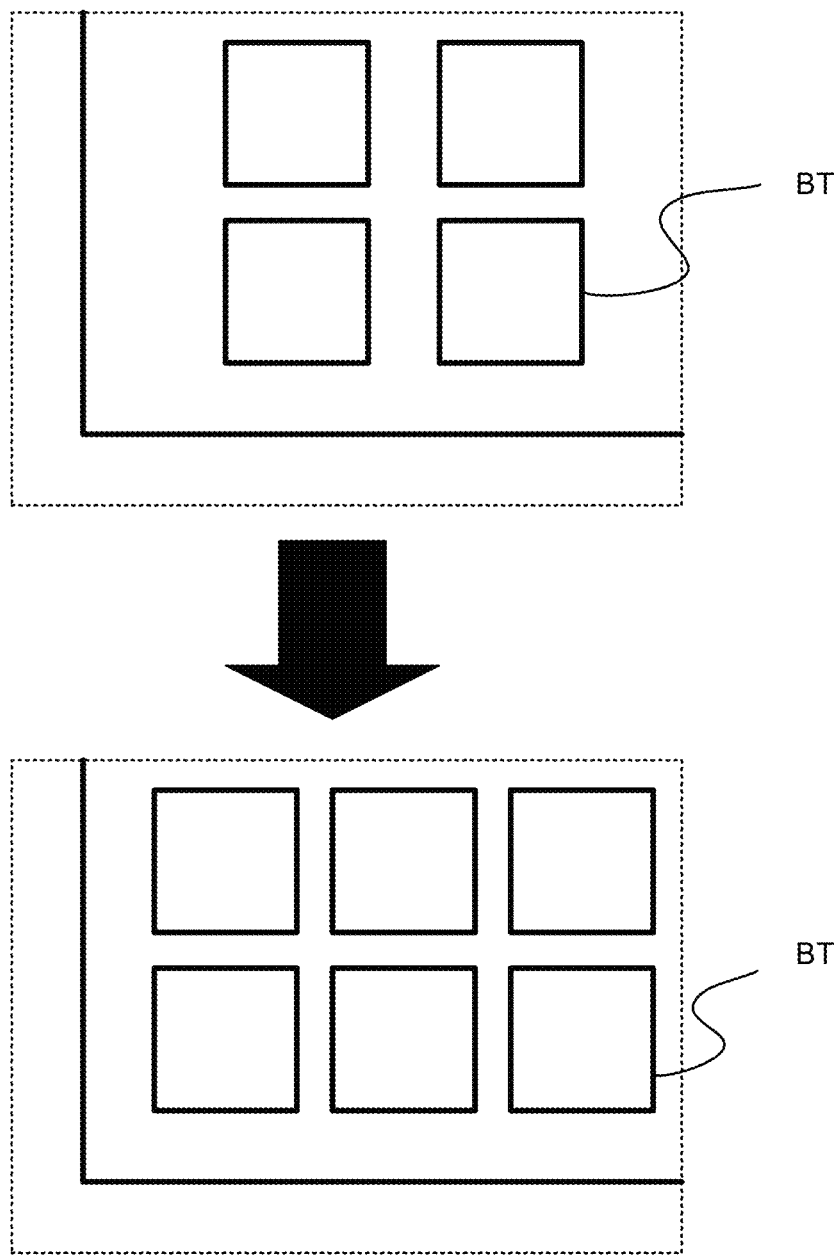
FIG. 7B is a schematic view illustrating a modified example of additional information created by the additional information creation unit.

FIGS. 7A and 7B are schematic views each illustrating a modified example of the additional information created by the additional information creation unit. For example, as illustrated in FIG. 7A, it is assumed that a group, such as a pattern A1 or A2, is stored as the group definition information GI stored in the database 130. At this time, as illustrated in FIG. 7B, even when four buttons BT have been extracted from one position, the candidate screen data CD including six buttons BT can be presented as long as the pattern A1 is stored on the assumption that it is used more often and thus is recommended.

As described above, according to the image creation support device and image creation support method for presenting candidate screen data of a display screen based on a design image of the display screen that has been designed arbitrarily according to the first embodiment of the present invention, it is possible to faithfully reproduce a design that is referred to in creating a display screen and thus reduce the portions to be corrected by reading a design image and creating input screen data with the image input unit, and creating candidate screen data corresponding to the input screen data with the screen data creation unit based on the type of each input part and additional information. It is also possible to support the user in creating the display screen by proposing the candidate screen data corrected with reference to the data used in the past.

Embodiment 2

Described next with reference to FIGS. 8 to 11 is an overview of an image creation support device and image creation support method for presenting candidate screen data of a display screen based on a design image of the display screen that has been designed arbitrarily according to Embodiment 2 of the present invention. It should be noted that in the description of the image creation support device and image creation support method according to Embodiment 2, configurations that are identical between or common to Embodiments 1 and 2 are denoted by identical reference signs on the drawings, and repeated description will be omitted.

Figure 8:
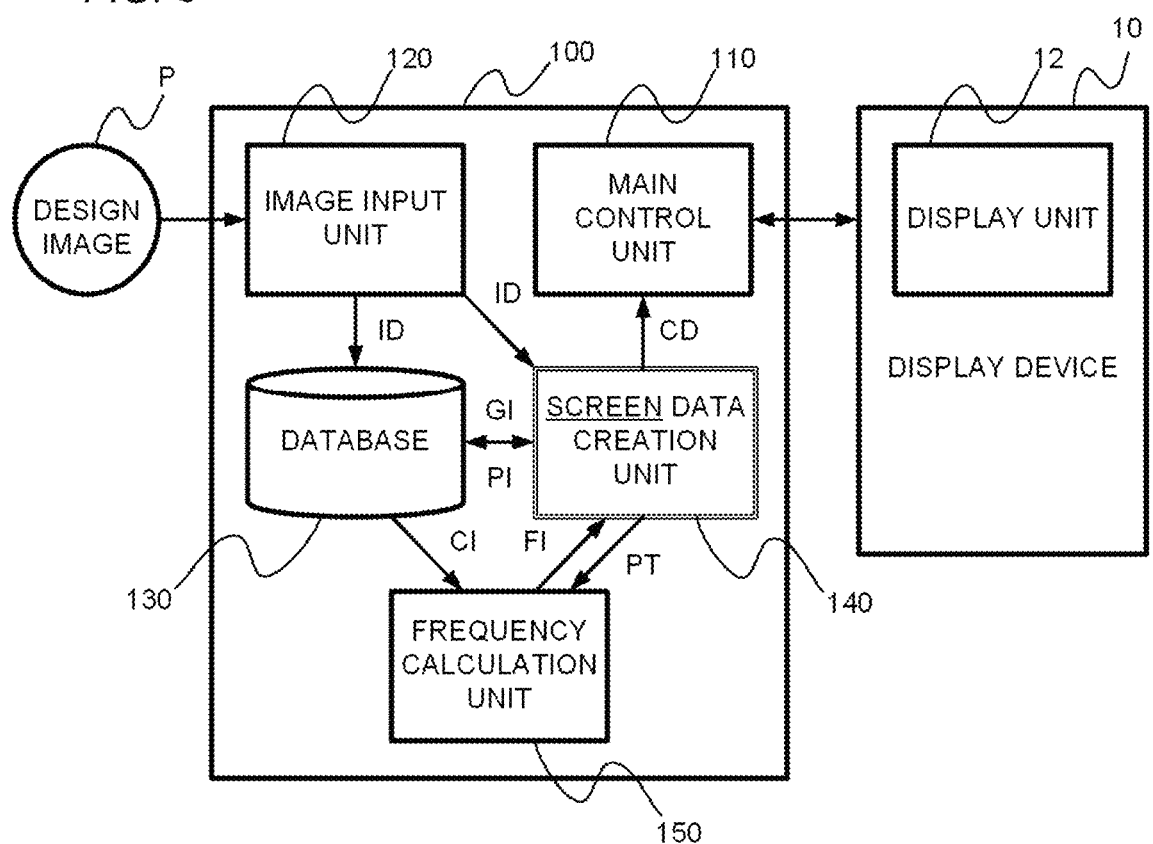
FIG. 8 is a block diagram illustrating an overview of an image creation support device according to Embodiment 2.

FIG. 8 is a block diagram illustrating an overview of an image creation support device according to Embodiment 2 of the present invention. As illustrated in FIG. 8, an image creation support device 100 is adapted to be applied in combination with a display device 10 as in Embodiment 1, and includes a main control unit 110, an image input unit 120, a database 130, a screen data creation unit 140, and a frequency calculation unit 150 that calculates the use frequency FI of parts data of each type PT based on the number-of-times information CI included in the parts information PI stored in the database 130.

The frequency calculation unit 150, upon receiving the parts information PI of the currently identified part from the screen data creation unit 140, accesses the database 130 to receive the number-of-times information CI corresponding to the parts information PI, and then performs a predetermined arithmetic operation on the number-of-times information CI, thereby determining the use frequency FI of the part of each type PT. In addition, the frequency calculation unit 150 is configured to send the use frequency FI to the screen data creation unit 140.

Figure 9:
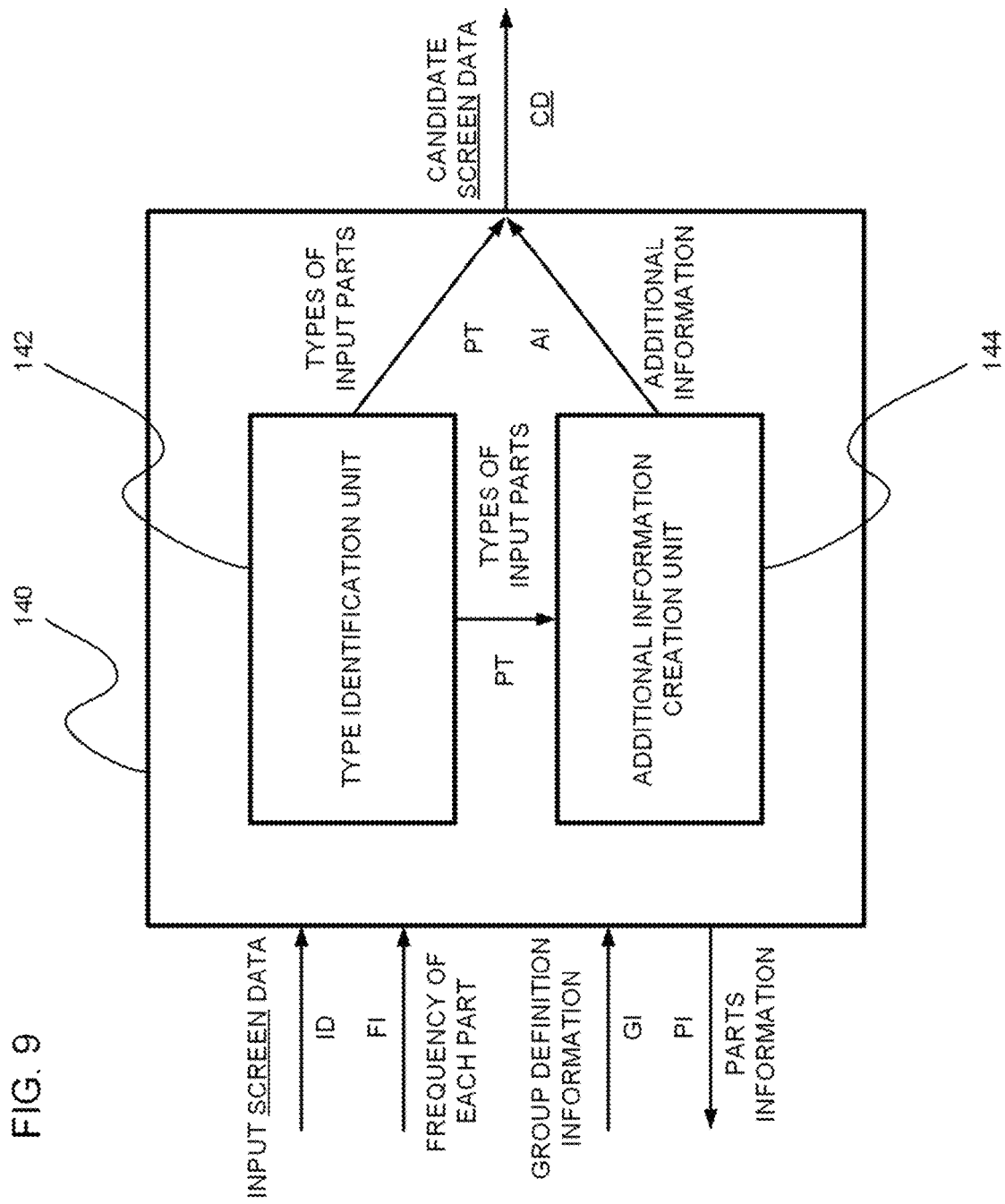
FIG. 9 is a block diagram illustrating an exemplary specific configuration of a screen data creation unit according to Embodiment 2.

FIG. 9 is a block diagram illustrating an exemplary specific configuration of the screen data creation unit according to Embodiment 2. As illustrated in FIG. 9, the screen data creation unit 140 includes a type identification unit 142, and an additional information creation unit 144 that creates additional information AI for the type PT of each input part based on group definition information GI and the use frequency FI calculated by the aforementioned frequency calculation unit 150. The screen data creation unit 140 is configured to create candidate screen data CD corresponding to input screen data ID based the type PT identified by the type identification unit 142 and the additional information AI created by the additional information creation unit 144, and send the data to the main control unit 110.

Next, an example of an image creation support method that uses the image creation support device 100 according to Embodiment 2 will be described.

Figures 10A, 10B:
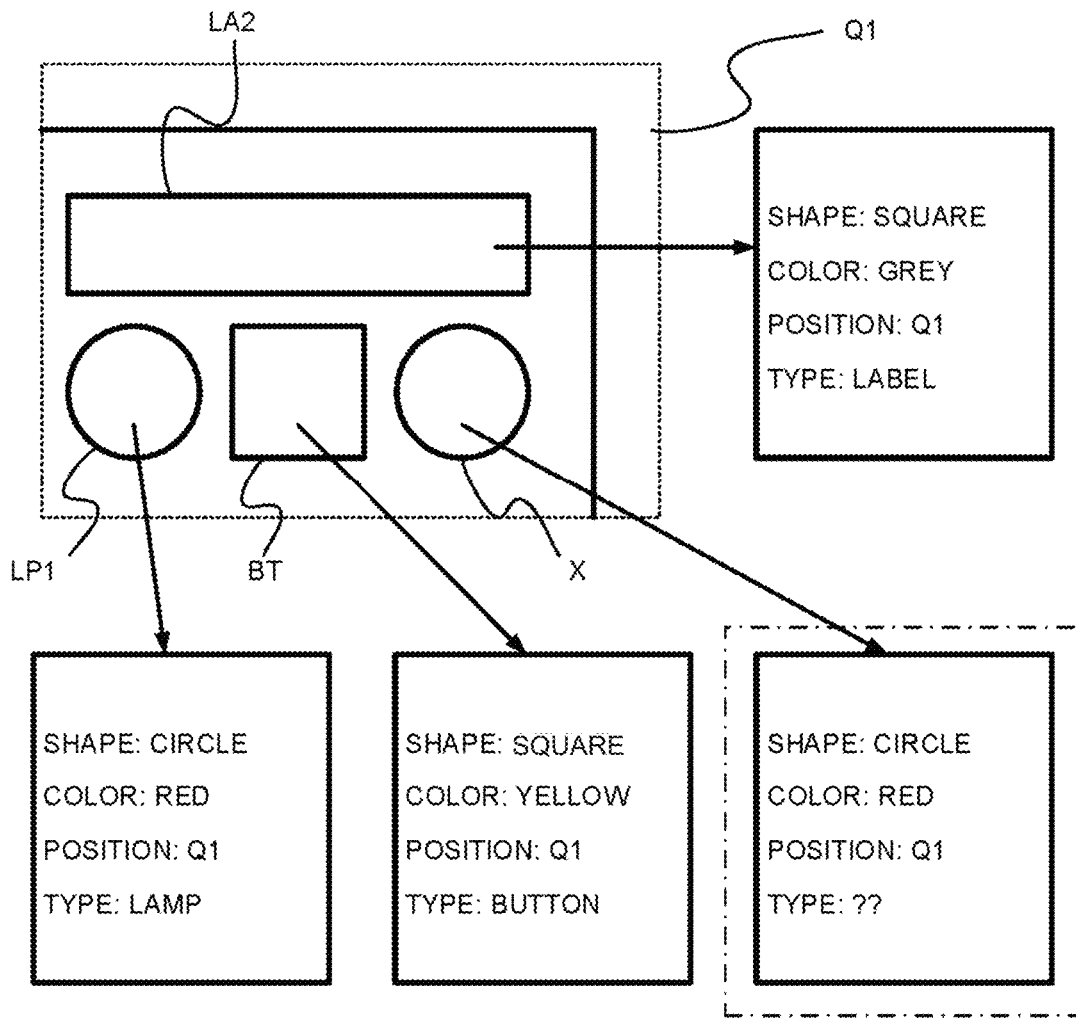
FIG. 10A is a view illustrating an overview of an operation executed by a frequency calculation unit according to Embodiment 2.
FIG. 10B is a view illustrating an overview of an operation executed by the frequency calculation unit according to Embodiment 2.

In the image creation support device 100 according to Embodiment 2, as illustrated in FIG. 10A, the type identification unit 142 individually extracts each part included in the first quadrant Q1 of the input screen data ID, for example. Accordingly, from the first quadrant Q1 illustrated in FIG. 10A, the parts information PI is extracted for one label LA2, one lamp LP1, one button BT, and one part of an unknown type, for example.

Herein, in the image creation support device 100 according to Embodiment 2, for such a part of an unknown type, the use frequency FI of each of pieces of parts data is calculated from the number-of-times information CI indicating the number of times of use in the past of each of the pieces of parts data stored in the database 130, and the results of calculation are sent to the screen data creation unit 140.

That is, the frequency calculation unit 150 reads the number-of-times information CI indicating the number of times of use in the past of a part of each type for each of the shape, color, and position as illustrated in FIG. 10B, for example. Herein, for the number-of-times information CI, an item to be prioritized over other items for identifying the type PT is determined, and a weighting factor is set for each item. The weighting factor can be determined arbitrarily, considering the use application of a device to which the display screen is applied, for example.

As a method for calculating the use frequency FI from the number-of-times information CI, the value of the number of times is applied to the following expression for a part of each type, for example.

$$\text{Use Frequency } FI = 0.6 \times \frac{30}{42} + 0.3 \times \frac{26}{32} + 0.1 \times \frac{6}{13} = 0.72 \quad [\text{Math. 1}]$$

(Use frequency of lamp)

$$\text{Use Frequency } FI = 0.6 \times \frac{10}{42} + 0.3 \times \frac{4}{32} + 0.1 \times \frac{4}{13} = 0.21 \quad [\text{Math. 2}]$$

(Use frequency of button)

$$\text{Use Frequency } FI = 0.6 \times \frac{2}{42} + 0.3 \times \frac{0}{32} + 0.1 \times \frac{3}{13} = 0.05 \quad [\text{Math. 3}]$$

(Use frequency of label)

$$\text{Use Frequency } FI = 0.6 \times \frac{0}{42} + 0.3 \times \frac{2}{32} + 0.1 \times \frac{0}{13} = 0.02 \quad [\text{Math. 4}]$$

(Use frequency of list box)

Then, in the screen data creation unit 140, the additional information creation unit 144 determines that the use frequency FI of the lamp is the highest in the number-of-times information CI illustrated in FIG. 10B from the foregoing calculation results, and creates additional information AI for estimating the part of an unknown type PT as the lamp LP1. Accordingly, the accuracy of identification of the type PT of each part in the candidate screen data CD can be improved.

Figure 11:
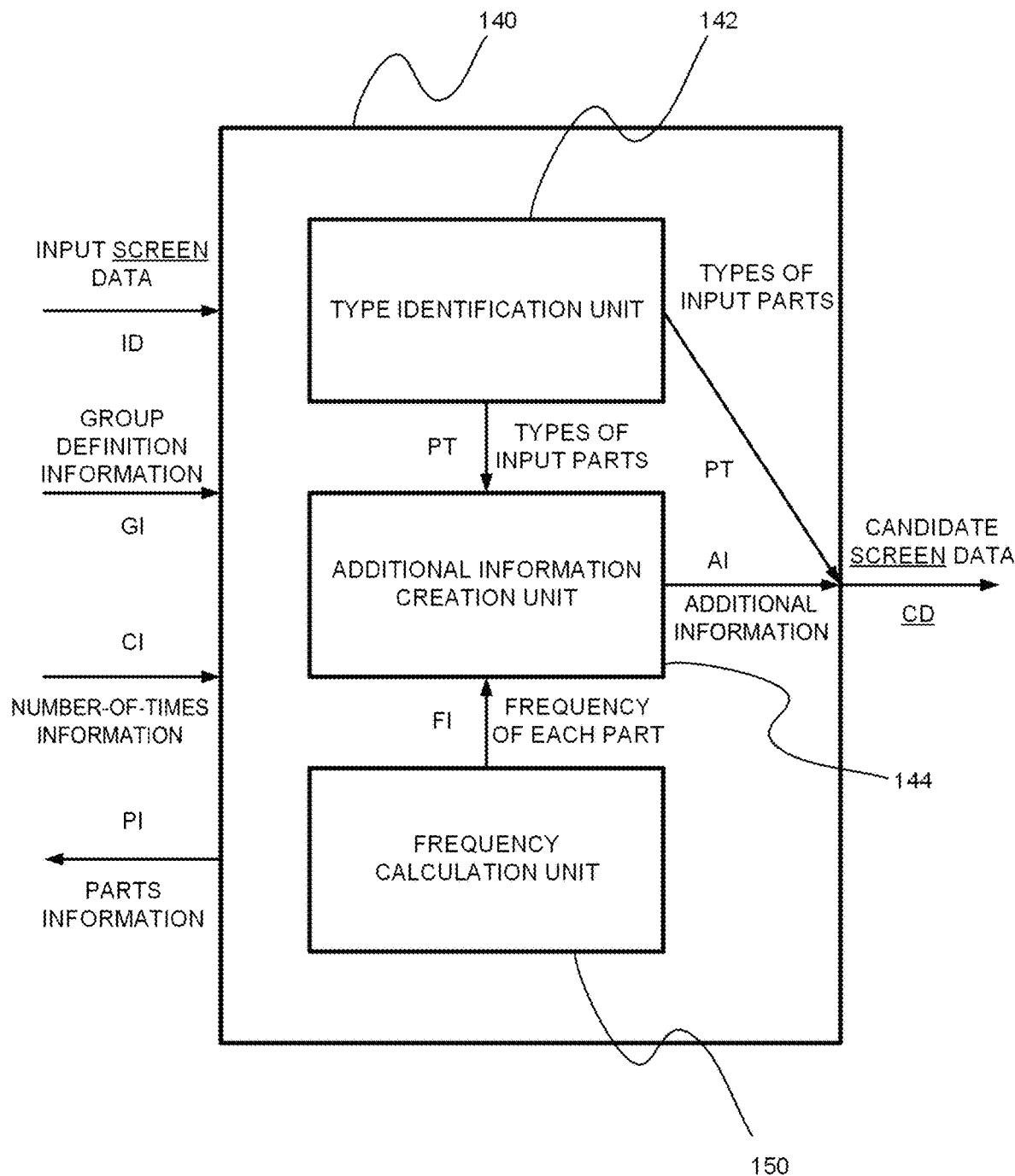
FIG. 11 is a block diagram illustrating a modified example of the screen data creation unit according to Embodiment 2.

FIG. 11 is a block diagram illustrating a modified example of the screen data creation unit according to Embodiment 2. As illustrated in FIG. 11, the screen data creation unit 140 of the image creation support device 100 according to Embodiment 2 may incorporate the frequency calculation unit 150 illustrated in FIG. 8. In such a case, information on the type PT of each part identified by the type identification unit 142 can be shared with the frequency calculation unit 150 within the screen data creation unit 140, and also, a special configuration for transmitting information becomes no more necessary. Thus, the configuration of the entire image creation support device 100 can be simplified.

As described above, according to the image creation support device and image creation support method for presenting candidate screen data of a display screen based on a design image of the display screen that has been designed arbitrarily according to Embodiment 2 of the present invention, it is possible to not only obtain the advantageous effects obtained in Embodiment 1 but also estimate the type of a part of an unknown type from the use frequency of each part in the past, and also improve the accuracy of identification of the type of each part for creating the final candidate screen data.

It should be noted that the present invention is not limited to the aforementioned embodiments, and can be changed as appropriate within the spirit of the invention. In the present invention, modification of any components of the embodiments or omission of any components of the embodiments is possible within the scope of the invention.

The invention claimed is:

1. An image creation support device for presenting candidate screen data of a display screen based on a design image of the display screen that has been designed, the image creation support device comprising:
   an image input unit configured to read the design image to create input screen data;
   a database configured to store pieces of parts data of display parts forming the display screen designed in the past; and
   a screen data creation unit configured to obtain the pieces of parts data from the database to create the candidate screen data corresponding to the input screen data,
   wherein:
   the database is also configured to store
      types of the pieces of parts data, each of the types representing a name or a title of a corresponding display part, and
      group definition information that is based on a combination of the pieces of parts data of a plurality of display parts together forming a group,
   the screen data creation unit includes
      a type identification unit configured to identify types of input parts included in the input screen data by associating a shape and the type of each part with each other, and
      an additional information creation unit configured to create additional information to be combined with the types of the input parts based on the group definition information, the additional information including information to change the type of an input part identified by the type identification unit to a different type of part based on the group definition information, and
   the screen data creation unit is configured to create the candidate screen data corresponding to the input screen data based on (1) the types of the input parts and (2) the additional information.

2. The image creation support device according to claim 1,
   wherein:
   the database is further configured to store number-of-times information indicating the number of times of use of each of the pieces of parts data,
   the image creation support device further comprises a frequency calculation unit configured to calculate a use frequency of the pieces of parts data of each type based on the number-of-times information, and
   the screen data creation unit is configured to create the candidate screen data taking into consideration the use frequency in addition to the types of the input parts and the additional information.

3. The image creation support device according to claim 2, wherein the frequency calculation unit is incorporated in the screen data creation unit.

4. The image creation support device according to claim 1,
   wherein:

the group definition information includes the number of the pieces of parts data in the group formed by the plurality of display parts, and the additional information creation unit is configured to add to the additional information a recommended number of the input parts included in the input screen data based on the number of the pieces of parts data.

5. The image creation support device according to claim 1, wherein the screen data creation unit is configured to correct the candidate screen data based on selection from a user.

6. An image creation support method for automatically creating candidate screen data of a display screen based on a design image of the display screen that has been designed, the image creation support method comprising:
reading the design image to create input screen data; and
after the design image has been read and the input screen data has been created, obtaining pieces of parts data from a database that stores pieces of parts data of display parts forming the display screen designed in the past, to create the candidate screen data corresponding to the input screen data,
wherein:
the database also stores
types of the pieces of parts data, each of the types representing a name or a title of a corresponding display part, and
group definition information that is based on a combination of the pieces of parts data of a plurality of display parts together forming a group, and
the method further comprises:
identifying types of input parts included in the input screen data by associating a shape and the type of each part with each other;
creating additional information to be combined with the types of the input parts based on the group definition information, the additional information including information to change the type of an input part to a different type of part based on the group definition information; and
after the types of the input parts included in the input screen data have been identified and the additional information to be combined with the types of the input parts has been created based on the group definition information, creating the candidate screen data based on (1) the types of the input parts and (2) the additional information.

7. The image creation support method according to claim 6, further comprising:
storing, in the database, number-of-times information indicating the number of times of use of each of the pieces of parts data; and
calculating a use frequency of the pieces of parts data of each type based on the number-of-times information,
wherein the candidate screen data is created taking into consideration the use frequency in addition to the types of the input parts and the additional information.

8. The image creation support method according to claim 6,
wherein:
the group definition information includes the number of the pieces of parts data in the group formed by the plurality of display parts, and
the method further comprises adding a recommended number of the input parts included in the input screen data to the additional information based on the number of the pieces of parts data.

9. The image creation support method according to claim 6, further comprising:
displaying the candidate screen data,
wherein after the candidate screen data is displayed, the candidate screen data is correctable based on selection from a user.

10. An image creation support device for presenting candidate screen data of a display screen based on a design image of the display screen that has been designed, the image creation support device comprising:
a database configured to store pieces of parts data of display parts forming the display screen designed in the past; and
a controller configured to
read the design image and create input screen data, and
obtain the pieces of parts data from the database and create the candidate screen data corresponding to the input screen data,
wherein:
the database is further configured to store types of the pieces of parts data, each of the types representing a name or a title of a corresponding display part and group definition information that is based on a combination of the pieces of parts data of a plurality of display parts together forming a group, and,
the controller is further configured to
identify types of input parts included in the input screen data by associating a shape and the type of each part with each other,
create additional information to be combined with the types of the input parts based on the group definition information, the additional information including information to change the type of the part identified by the controller to a different type of part based on the group definition information, and
create the candidate screen data corresponding to the input screen data based on (1) the types of the input parts and (2) the additional information.

11. The image creation support device according to claim 10,
wherein:
the database is further configured to store number-of-times information indicating the number of times of use of each of the pieces of parts data,
the controller is further configured to
calculate a use frequency of the pieces of parts data of each type based on the number-of-times information, and
create the candidate screen data taking into consideration the use frequency in addition to the types of the input parts and the additional information.

12. The image creation support device according to claim 10,
wherein:
the group definition information includes the number of the pieces of parts data in the group formed by the plurality of display parts, and
the controller is further configured to add to the additional information a recommended number of the input parts included in the input screen data based on the number of the pieces of parts data.

13. The image creation support device according to claim 10, wherein controller is configured to correct the candidate screen data based on selection from a user.

* * * * *